E. P. GAYLORD.
WATER CONTROLLING DEVICE.
APPLICATION FILED MAY 14, 1909.

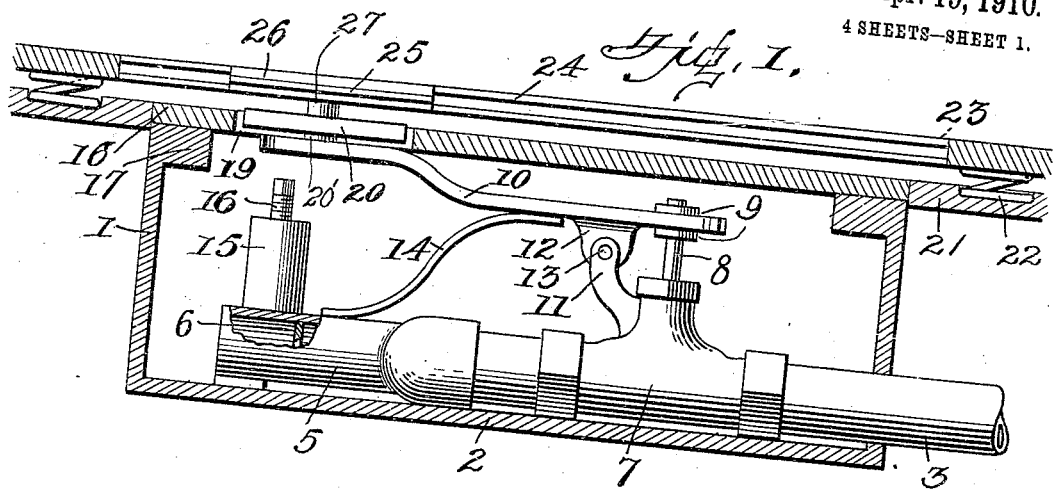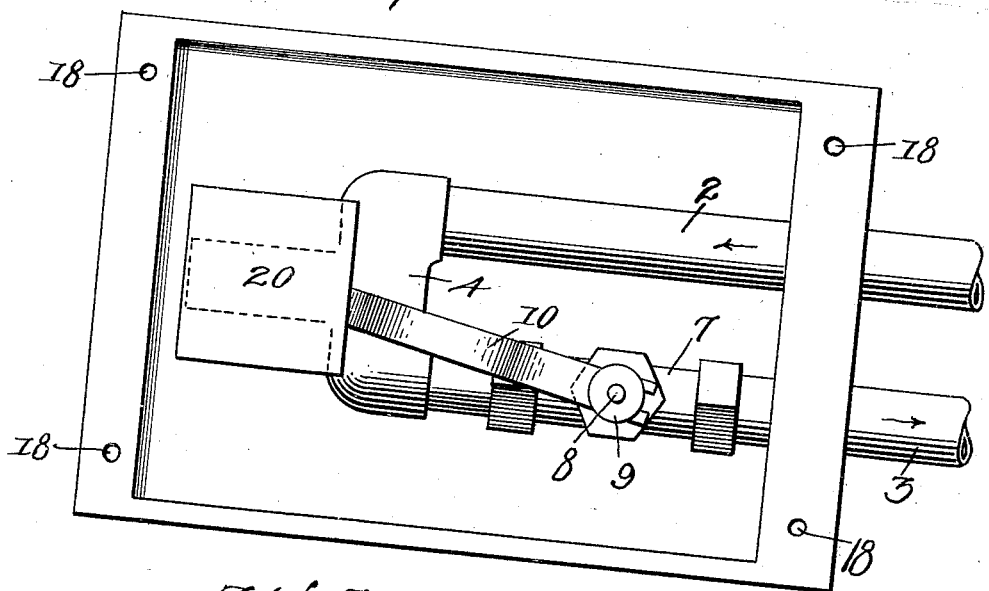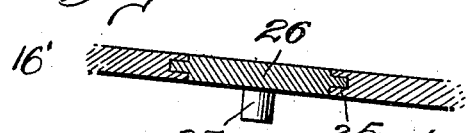

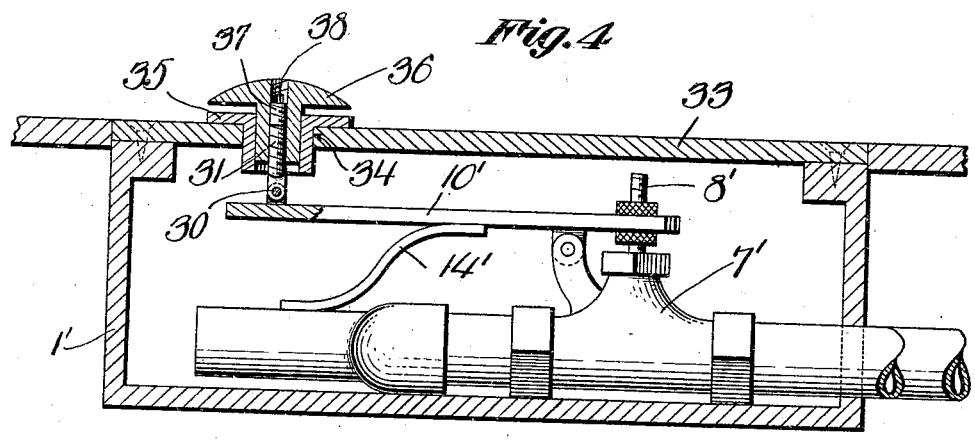
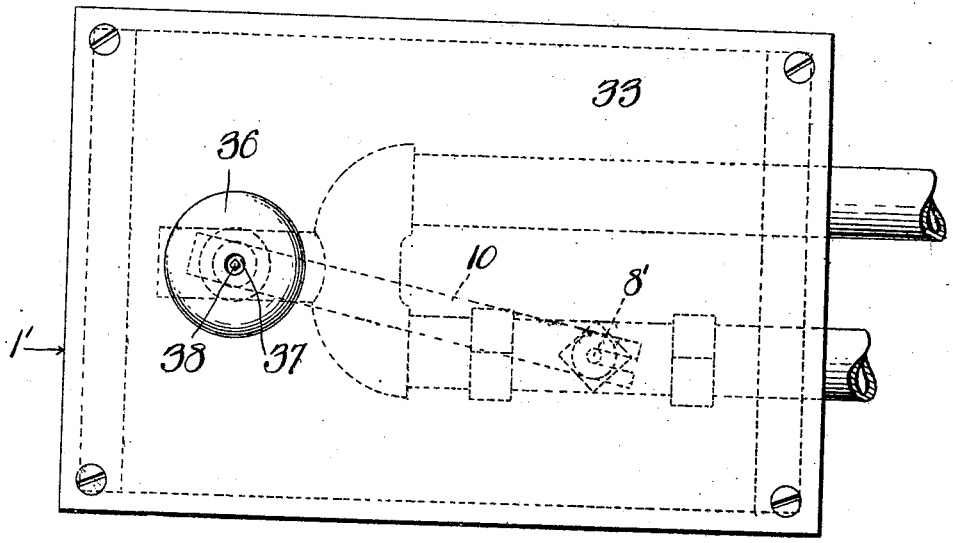

955,150.

Patented Apr. 19, 1910.

4 SHEETS—SHEET 3.

Witnesses
Charles Richardson.

Inventor
Edwin P. Gaylord,
By Victor J. Evans
Attorney

E. P. GAYLORD.
WATER CONTROLLING DEVICE.
APPLICATION FILED MAY 14, 1909.

955,150.

Patented Apr. 19, 1910.

4 SHEETS—SHEET 4.

Witnesses
Chas C. Richardson
Wm J. Koerth

Inventor
Edwin P. Gaylord,
By Victor J. Evans
Attorney

UNITED STATES PATENT OFFICE.

EDWIN P. GAYLORD, OF ROCHESTER, NEW YORK, ASSIGNOR TO IDEAL CARRIAGE WASHER AND AUTOMATIC WATER SAVER COMPANY, OF ROCHESTER, NEW YORK, A CORPORATION OF NEW YORK.

WATER-CONTROLLING DEVICE.

955,150.   Specification of Letters Patent.   Patented Apr. 19, 1910.

Application filed May 14, 1909. Serial No. 496,030.

*To all whom it may concern:*

Be it known that I, EDWIN P. GAYLORD, a citizen of the United States, residing at Rochester, in the county of Monroe and State of New York, have invented new and useful Improvements in Water - Controlling Devices, of which the following is a specification.

This invention relates to water controlling devices, and the object of the invention is to provide a device of this character whereby a predetermined amount of water may be caused to flow through a pipe and wherein the useless waste of water is entirely prevented.

With the above, and other objects in view which will appear as the description progresses, the invention resides in the novel construction and arrangement of parts hereinafter fully described and claimed.

Figure 6:
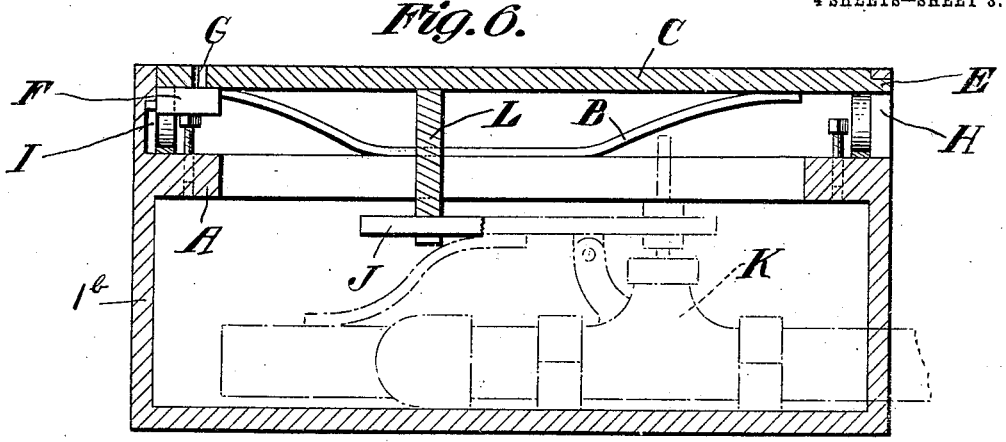
Figure 7:
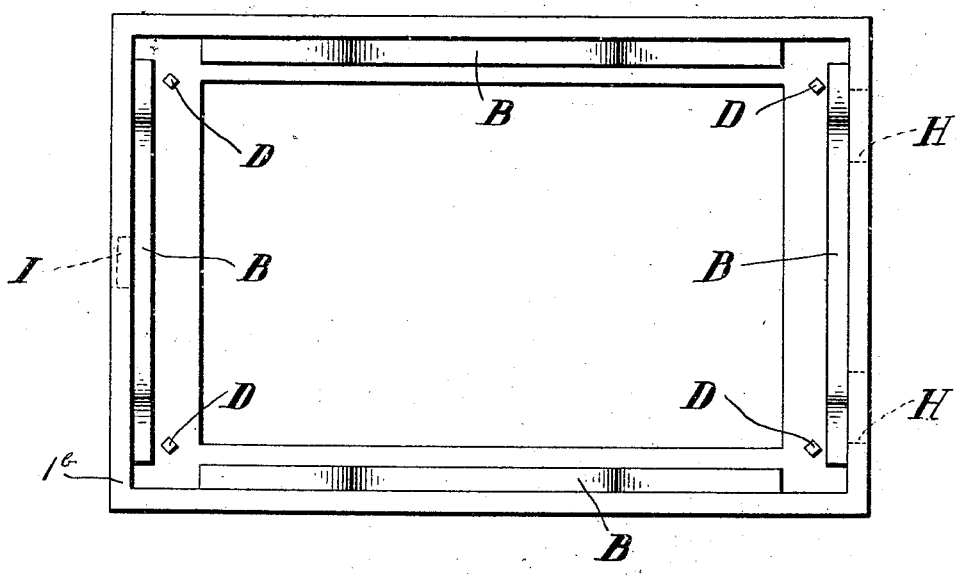
Figure 9:
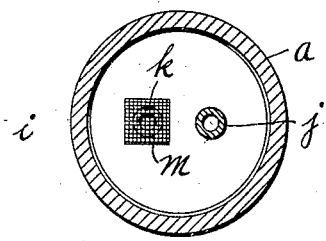
Figure 8:
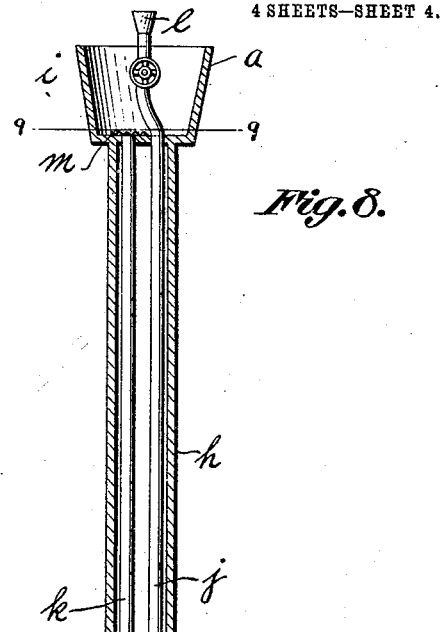
Figure 10:
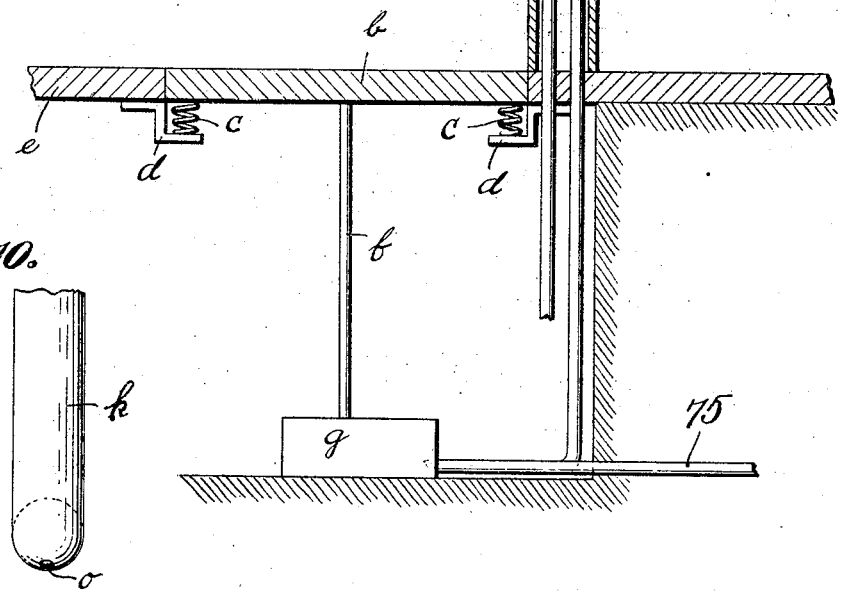

In the accompanying drawings, there has been illustrated several modified forms of the device, and in which, Figure 1 is a longitudinal sectional view through a device constructed in accordance with the present invention. Fig. 2 is a top plan view of the box containing the apparatus, the cover and flexible platform being removed. Fig. 3 is a detail transverse sectional view taken through the heel plate and a portion of the movable platform with which the plate is connected. Fig. 4 is a longitudinal sectional view showing a slightly modified form of the device. Fig. 5 is a top plan view of the device illustrated in Fig. 4. Fig. 6 is a longitudinal sectional view of a still further modified form of the device. Fig. 7 is a top plan view of the box employed with Fig. 6, and having the top plate removed. Fig. 8 is a vertical longitudinal sectional view showing the apparatus attached to a sanitary drinking fount. Fig. 9 is a sectional view upon the line 9—9 of Fig. 8. Fig. 10 is a detail view of the outlet pipe showing the vent in the bottom thereof which is adapted to be positioned below the frost line.

In the accompanying drawings and referring particularly to Figs. 1, 2 and 3 thereof, the numeral 1 designates a rectangular casing having an open top. The casing 1 is adapted for the reception of an inlet pipe 2 and an outlet pipe 3, both of which being connected through the medium of a suitable coupling 4. This coupling 4 has a central rearwardly extending air chamber 5 and positioned within the chamber is a rubber cushion 6 which is adapted to limit the recoil of the water when a valve 7 connected with the outlet pipe 3 is closed. The valve 7 is of the self closing type and is provided with an upwardly extending valve stem 8 having enlarged spaced heads 9 which are adapted to receive the bifurcated ends of an operating lever 10. The casing of the valve 7 is provided with a suitable lug or ear 11, while the under face of the operating lever 10 is provided with a suitable lug 12, and the members 11 and 12 are each provided with alining perforations adapted for the reception of a pintle 13 whereby the member 10 is hingedly connected with the valve stem 8.

In order to retain the lever 10 in its normal raised position a flat spring or other analogous tension device 14 is interposed between the lower face of the lever and the chamber 5 of the coupling 4. The chamber 5 is also provided with an upwardly projecting portion 15 which has a centrally arranged threaded bore that is adapted for the reception of a threaded stop screw 16, which can be regulated within the member 15 so as to limit the downward movement of the member 10, beneath which it is directly positioned, when desired, thus regulating the throw of the valve stem 8 and allowing the water to pass through the outlet pipe 3 at a predetermined flow.

The open top of the rectangular casing 1 may be provided with a suitable closure 16', or if found more convenient the inwardly extending flanges 17 carried by the casing may be provided with suitable perforations adapted for the reception of engaging elements whereby the casing may be sustained upon a floor or other desired support. The closure 16' illustrated in the present instance is provided with a suitable opening 19 and the end of the lever 10 is provided with a platform 20, which is connected thereto through the medium of a suitable stud 20', and the platform 20 is adapted to extend through this opening and to have its upper face upon a level with the top of the closure 16'. The platform 20 may be retained at or slightly above the level of the closure 16′ by having the lever 10 provided with an offset as clearly illustrated in Fig. 1 of the drawings, and the purpose of this platform will hereinafter be fully described.

The numeral 21 designates a floor arranged upon a line with the closure 16′ and this floor 21 is provided with a plurality of circular depressions preferably four in number, adapted for the reception of helical springs 22 which are arranged so as to support the four corners of a substantially rectangular platform 23, and whereby the said platform is arranged at a suitable distance above the floor 21 and the closure 16′. The platform 23 has its central longitudinally extending portion cut away for a suitable distance, and the longitudinally extending walls thus provided have each longitudinally extending grooves 24. These grooves are adapted to engage tongues 25 provided upon a sliding heel plate 26. The heel plate 26 has its bottom face provided with a stud or projection 27, and this stud is adapted to engage with the platform 20 when the device is to be regulated. It is to be understood that the plate 26 may be slid at any desired point along the longitudinal cut away portion of the platform 23, and it will be further understood that when the heel plate 26 has its stud 27 moved away from the platform 20 it will be impossible to operate the platform 20 by the foot, the cut away portion 24 being of such a width as to prevent the entrance of the heel or the toe of a person attempting to engage the platform 20. It is to be further understood that the heel plate 26 may be provided with a suitable lock, not shown, whereby the same may be prevented from moving without the consent of the holder of the key to the lock.

In Figs. 4 and 5, I have illustrated a slight modified form of the device. In these figures the operating lever 10′ is sustained upon the valve stem 8′ in a manner substantially similar to that heretofore described and the said lever 10′ is retained in its normal, substantially horizontal position through the medium of a resilient element 14′. The end of the lever opposite to that at its point of connection with the stem 8′ is provided with a suitable lug or projection 30, and this lug is pivotally connected with a threaded element 31.

The numeral 33 designates the closure for the casing 1′. The closure 33 is adapted to be so positioned upon the said casing 1′ as to prevent its fraudulent removal it being necessary to remove the screws and the thimble 36 before the apparatus within the casing 1 can be interfered with. The closure 33 is provided with a suitable opening 34, which is adapted for the reception of a headed bushing 35 and within which is mounted for rotation a thimble 36. This thimble 36 is provided with a centrally arranged threaded aperture for the reception of the threaded member 31 of the lever 10′. It will be noted that by rotating the thimble 36 the swing of the valve stem 8′ may be readily regulated, and it will be further noted that as the thimble 36 is forced downward within the bushing 35, the lever 10, will be swung to open the valve 7′. In order to prevent the thimble 36 from being fraudulently moved upon the threaded member 31 of the lever 10′, I have provided a locking member 37. This member 37 comprises a threaded element adapted to be positioned within the bore of the thimble 36 and to contact the upper face of the member 31. This member 37 has its upper end reduced and of a non-circular formation, as designated by the numeral 38. The portion 38 is adapted for the reception of a suitable wrench, whereby the member 37 may be readily adjusted within the threaded bore of the thimble 36 and whereby the thimble may be rotated into proper adjustment upon the threaded member 31.

In Figs. 6 and 7, I have illustrated a still further modified form of the device. In this instance the rectangular casing 1$^b$ is provided a distance from its open top with a flange A, which projects inwardly and extends around the entire portion of the casing for a suitable distance. Both the longitudinally extending and transverse walls provided by this flange A have each of their upper faces provided with resilient elements B. The elements employed in the present construction are flattened spring members having their ends extending upwardly and these resilient elements are adapted for the reception of a suitable closure C. The closure C is of a size corresponding with the open top of the receptacle and is adapted to fit loosely therein. The flange A is provided, adjacent its four corners with suitable threaded regulating members D. These members D are adapted to limit the downward movement of the closure C when pressure is applied thereon, and for a purpose hereinafter set forth. The closure C has one of its ends provided with spaced ears E and its opposite end provided with a suitable lock F. The lock F is positioned under the under face of the said closure and the closure is provided with a suitable key hole G communicating therewith. By this arrangement it will be noted that the ears E of the closure may be first inserted within suitable slots H provided within one end of the casing and the opposite end of the closure forced downwardly against the pressure of the springs B until the bolt of the lock F is in a position to engage with a vertically extending slot or cut away portion I provided in the opposite end of the casing. By this arrangement it will be noted that when pressure is applied upon the closure C the latter will be forced downwardly against the resilient elements B until the same is contacted by the headed stop members D, while at the same time it is impossible to remove the closure C or interfere with the adjustment of the members D.

The letter J designates the operating lever for the controlling device K which is positioned within the casing 1ᵇ. This lever J is of a similar construction and performs a similar function to that heretofore described, and adapted to contact and depress the said lever J, when pressure is applied upon the cover C, is a depending finger L, which is securely connected with the said plate. In this construction it will be noted that it will be impossible for unauthorized persons to tamper with the regulating devices D and that only the person holding the key to the lock F can remove the closure C.

In Figs. 8, 9 and 10 I have illustrated a still further modified form of the device. In these figures the apparatus is applied to a sanitary drinking fount a. The letter b designates a movable floor having its under faces provided with resilient elements c mounted in suitable brackets d upon the floor e. The platform b is provided with a depending rod f which is adapted to contact with an operating lever provided within a casing g and similar to that heretofore described. Mounted upon the floor e adjacent the movable platform or portion thereof is a vertically projecting pipe h having its upper extremity formed with a bowl i. Positioned within this pipe or casing h is an inlet pipe j and an outlet k. The pipe k extends upwardly beyond the upper edge of the bowl i and has its extremity provided with a conical outlet l. The outlet pipe k is provided with a suitable screen m positioned upon the bottom of the bowl i and this pipe k having its lower portion extending within the pit is provided with a suitable vent o which is positioned below the frost line so as to prevent the water within the pipe k from becoming frozen.

The numeral 75 represents the inlet pipe to the apparatus contained within the casing g, and from the above description it will be noted that the flow of water passing through the outlet or nozzle 1 may be readily regulated through the medium of the valve upon the pipe j or through devices similar to that previously described for limiting the downward movement of the platform b and the consequent movement of the valve controlling lever contacted by the rod f.

While I have illustrated and described the preferred embodiments of the invention as they now appear to me, it is to be understood that minor details of construction within the scope of the following claims may be resorted to if desired.

Having thus fully described the invention what is claimed as new is:

1. In a device for the purpose set forth, a casing, an inlet and an outlet pipe connected together and within the casing, a self closing valve for the outlet pipe, a stem for the valve, a pivoted lever connecting the stem, a heel plate resiliently positioned above the stem, and an adjustable element below the lever to limit the downward movement thereof.

2. In a device of the character described, a casing provided with an inlet and an outlet pipe connected together, a self closing valve connected with the outlet pipe, a stem for the valve, a pivoted lever connected with the stem, a flexible platform above the casing adapted upon pressure to contact the lever, and an adjustable member positioned directly below the lever to limit the downward movement thereof.

3. A casing provided with an inlet and an outlet pipe connected together, a self closing valve upon the outlet pipe, a pivoted lever connected with the valve, a yieldable member above the lever and adapted to exert downward pressure thereon, and adjustable means for limiting the downward movement of the lever.

4. An inlet and an outlet pipe connected together, a valve upon the outlet pipe, a pivoted lever connected with the valve, a yieldable element above the lever, and a connection between the yieldable element and the lever.

5. In a device for the purpose set forth, an inlet and an outlet pipe connected together, a valve for one of these pipes, an operating lever connected with this valve, a resilient member between the pipe members and the lever, a movable member connected with the lever, and means for adjusting the limit of movement of the said member.

6. In a device for the purpose set forth, a casing, an inlet and an outlet pipe connected together within the casing, the connection for the pipes having a rearwardly extending chamber, a resilient cushion within the chamber, a self closing valve upon the outlet pipe, a stem for the valve, a pivoted lever engaging the stem, a resilient element between the lever and the pipe connection, a member carried by the top and contacting the lever and means for limiting the downward movement of the top as pressure is applied thereon.

In testimony whereof I affix my signature in presence of two witnesses.

EDWIN P. GAYLORD.

Witnesses:
 LEON L. BENHAM,
 W. J. SIMPSON.